United States Patent
Kim et al.

(10) Patent No.: US 11,310,754 B2
(45) Date of Patent: Apr. 19, 2022

(54) NODES AND METHODS FOR DETERMINING AND ENABLING A SYNCHRONIZED TIME REFERENCE IN A WIRELESS COMMUNICATIONS NETWORK

(71) Applicant: Telefonaktiebolaget LM Ericsson (publ), Stockholm (SE)

(72) Inventors: Junghoon Kim, Anyang-si (KR); Hyunsoo Kim, Anyang-si (KR); Mikael Olofsson, Belfort (FR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/765,761

(22) PCT Filed: Nov. 20, 2017

(86) PCT No.: PCT/SE2017/051151
§ 371 (c)(1),
(2) Date: May 20, 2020

(87) PCT Pub. No.: WO2019/098898
PCT Pub. Date: May 23, 2019

(65) Prior Publication Data
US 2020/0383076 A1    Dec. 3, 2020

(51) Int. Cl.
*H04W 56/00* (2009.01)
*H04B 7/185* (2006.01)

(52) U.S. Cl.
CPC .... *H04W 56/0015* (2013.01); *H04B 7/18513* (2013.01)

(58) Field of Classification Search
CPC . H04B 7/18513; H04B 7/2693; H04J 3/0658; H04W 56/0015;
(Continued)

(56) References Cited

U.S. PATENT DOCUMENTS

| | | | |
|---|---|---|---|
| 6,266,012 B1 * | 7/2001 | Kangas | G01S 1/026 342/387 |
| 2002/0135495 A1 * | 9/2002 | Lei | H04B 3/54 340/870.11 |

(Continued)

FOREIGN PATENT DOCUMENTS

| | | |
|---|---|---|
| WO | 2015057156 A2 | 4/2015 |
| WO | 2016181198 A1 | 11/2016 |

OTHER PUBLICATIONS

International Search Report and the Written Opinion of the International Searching Authority, issued in corresponding International Application No. PCT/SE2017/051151, dated Aug. 7, 2018, 8 pages.

(Continued)

*Primary Examiner* — Ankur Jain
(74) *Attorney, Agent, or Firm* — Rothwell, Figg, Ernst & Manbeck, P.C.

(57) ABSTRACT

A method performed by a first network node (110) for determining a synchronized time reference in a wireless communications network (100) is provided. The first network node (110) determine a first timing reference ($t_3$) by detecting a broadcasted time reference signal ($S_1$). Also, the first network node (110) receive information indicating a first timing difference ($\Delta t_{21-22}$) between a second timing reference ($t_{21}$) that is based on a detection of the broadcasted time reference signal (S1) at a second network node (111) and a third timing reference ($t_{22}$) that is based on a positioning signal ($S_2$) received by the second network node (111). Then, the first network node (110) determine a time reference for the first network node (110) based on the determined first timing reference ($t_3$) and the received first timing difference ($\Delta t_{21-22}$). A first network node (110) for determining a timing reference in a wireless communications network (100) is also provided. Furthermore, a second network node (111) and a method performed therein for (Continued)

enabling a synchronized time reference in a wireless communications network (100) are also provided.

14 Claims, 7 Drawing Sheets

(58) Field of Classification Search
CPC ... H04W 56/001–005; H04W 56/0065; H04W 56/002; H04W 72/0446; H04L 5/1469
See application file for complete search history.

(56) References Cited

U.S. PATENT DOCUMENTS

| | | |
|---|---|---|
| 2004/0047307 A1 | 3/2004 | Yoon et al. |
| 2004/0151152 A1* | 8/2004 | Kim ................. H04W 56/0065 370/342 |
| 2005/0037786 A1 | 2/2005 | Edge |
| 2013/0183905 A1* | 7/2013 | Richardson ....... H04W 56/0015 455/67.11 |
| 2015/0312870 A1* | 10/2015 | Koorapaty ........ H04W 56/0015 370/350 |

OTHER PUBLICATIONS

Wheaton "Application of additional secondary factors to LORAN-C positions for hydrographic operations" Calhoun: The NPS Institutional Archive, DSpace Repository, Thesis and Dissertation Collection, http://nps.edu/library, 1982, 269 pages.

Curry, "Delivering a National Timescale Using eLORAN" Chronos Technology Ltd., Issue 1.0, Jun. 7, 2014, 22 pages.

Rhee et al. "eLoran Signal Strength and Atmospheric Noise Simulation over Korea" J. Korean GNSS Society 2(2), 101-108 (2013) http://dx.doi.org/10.11003/JKGS.2013.2.2.101, 8 pages.

Seo et al. "eLoran in Korea—Current Status and Future Plans", ENC 2013, 5 pages.

Ecker, "Loran-C User Handbook", Commandant Publication P16562. 5, (M16562.3, dated May 1980), 160 pages.

Belke, "Standard Frequency and Time Signal Stations on Longwave and Shortwave", Dec. 12, 2004, 28 pages.

* cited by examiner

NODES AND METHODS FOR DETERMINING AND ENABLING A SYNCHRONIZED TIME REFERENCE IN A WIRELESS COMMUNICATIONS NETWORK

CROSS REFERENCE TO RELATED APPLICATION(S)

This application is a 35 U.S.C. § 371 National Phase Entry Application from PCT/SE2017/051151, filed Nov. 20, 2017, designating the United States, the disclosure of which is incorporated herein by reference in its entirety.

TECHNICAL FIELD

Embodiments herein relate to time synchronization in a wireless communications network. In particular, embodiments herein relate to a first network node and method therein for determining a synchronized time reference in a wireless communications network. Also, embodiments herein further relates to a second network node and method therein for enabling a synchronized time reference in a wireless communications network.

BACKGROUND

In today's wireless communications networks a number of different technologies are used, such as 5G/New Radio (NR), Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network comprises radio base stations providing radio coverage over at least one respective geographical area forming a cell. Wireless devices, also referred to herein as User Equipments, UEs, mobile stations, and/or wireless terminals, are served in the cells by the respective radio base station. The wireless devices transmit data over an air or radio interface to the radio base stations in uplink transmissions and the radio base stations transmit data over an air or radio interface to the wireless devices in downlink transmissions.

However, in order to perform uplink and downlink transmissions in the wireless communications networks, it is often required that the radio base stations are synchronized in time. This is essential in some wireless communications networks, such as, e.g. LTE, 5G/NR, and Time-Division Duplex, TDD, based systems, but also for some applications therein, such as, e.g. evolved Multimedia Broadcast Multicast Service, eMBMS, or Observed Time Difference of Arrival, OTDOA. Examples of time synchronization requirements for some wireless communications technologies are shown in Table 1:

TABLE 1

| Technology | Time/Phase |
| --- | --- |
| CDMA2000 | +/−3 us with respect to UTC (during normal conditions) |
|  | +/−10 us of UTC (when the time synchronization reference is disconnected) |
| WCDMA(TDD) | 2.5 us phase difference between Base Stations +/−1.25 us) |
| TD-SCDMA | 3 us phase difference between Base Stations +/−1.5 us) |

TABLE 1-continued

| Technology | Time/Phase |
| --- | --- |
| LTE-TDD | +/−1.5 (small cell, ≤3 km cell radius) |
|  | +/−5 us (large cell, >3 km cell radius) |
| eMBMS | +/−1.5 (small cell, ≤3 km cell radius) |
|  | +/−5 us (large cell, >3 km cell radius) |

The time synchronization requirement for 5G/NR are not set, but it will most likely be the same as for LTE-TDD, i.e. 1.5 μs.

The main time synchronization reference used today by radio base stations in wireless communications networks is the Global Navigation Satellite System (GNSS) Global Positioning System, GPS. GPS is available around the globe and provides time accuracy in the area of 100 ns. However, the main drawback with GPS is that the positioning signal does not penetrate buildings and often requires that the antenna is mounted with good sky view, e.g. on the exterior of a building. Another disadvantage is that the positioning signal is weak and easily jammed un-intentionally or intentionally by other equipment or surroundings.

One solution to this problem could be, for example, to install hardware in the radio base stations and the core network of the wireless communications network that support, for example, a timing protocol by which a central time source performs a time synchronization with each radio base station. This, however, requires large investments in the network equipment and that the operator have a control over the wired communications network or backhaul of the wireless communications network. Even so, in many cases, such a timing protocol will not provide a better accuracy than 1.5 us—disqualifying it for features in a wireless communications network with high time accuracy requirement, such as, for example, positioning services.

Hence, there is a need to improve time synchronization in wireless communications networks.

SUMMARY

It is an object of embodiments herein to improve time synchronization in a wireless communications network.

According to a first aspect of embodiments herein, the object is achieved by a method performed by a first network node for determining a synchronized time reference in a wireless communications network is provided. The first network node determine a first timing reference by detecting a broadcasted time reference signal. Also, the first network node receives information indicating a first timing difference between a second timing reference that is based on a detection of the broadcasted time reference signal at a second network node and a third timing reference that is based on a positioning signal received by the second network node. Then, the first network node determine a synchronized time reference for the first network node based on the determined first timing reference and the received first timing difference.

According to a second aspect of embodiments herein, the object is achieved by a first network node for determining a synchronized time reference in a wireless communications network. The first network node is configured to determine a first timing reference by detecting a broadcasted time reference signal. The first network node is also configured to receive information indicating a first timing difference between a second timing reference that is based on a detection of the broadcasted time reference signal at a second network node and a third timing reference that is based on a positioning signal received by the second network node. The first network node is further configured to determine a synchronized time reference for the first network node based on the determined first timing reference and the received first timing difference.

According to a third aspect of embodiments herein, the object is achieved by a method performed by a second network node for enabling a synchronized time reference in a wireless communications network. The second network node determine a first timing reference by detecting a broadcasted time reference signal. Also, the second network node receives a positioning signal indicating a second timing reference. Then, the second network node determine information indicating a first timing difference between the first timing reference and the second timing reference. Furthermore, the second network node transmits the determined information to a first network node in the wireless communications network.

According to a fourth aspect of embodiments herein, the object is achieved by a second network node for enabling a synchronized time reference in a wireless communications network. The second network node is configured to determine a first timing reference by detecting a broadcasted time reference signal. The second network node is also configured to receive a positioning signal indicating a second timing reference. Then, the second network node is configured to determine information indicating a first timing difference between the first timing reference and the second timing reference. Further, the second network node is configured to transmit the determined information to a first network node in the wireless communications network.

According to a fifth aspect of the embodiments herein, computer programs are also provided configured to perform the methods described above. Further, according to a sixth aspect of the embodiments herein, carriers are also provided configured to carry the computer programs configured for performing the methods described above.

By being able to determine a timing reference by detecting a broadcasted time reference signal in a first network node and receiving information, from a second network node, indicating a time difference between the reception of the same broadcasted time reference signal at the second network node and the reception of a positioning signal at the second network node, a time synchronization at the first network node is enabled. The obtained synchronized time reference may in this way be obtained by utilizing signals from both a low frequency terrestrial navigation or timing system, i.e. the broadcasted time reference signal, and a positioning system, i.e. the positioning signal. While none of a low frequency terrestrial navigation or timing system or a global positioning system are able to provide a reliable and precise synchronized time reference to the first network node by themselves, this time synchronisation effectively combines the benefits of these two systems. For example, by utilizing a broadcasted time reference signal, which is generally robust against signal interference and thus most likely able to be detected by both the first and second network node, the vulnerability to interference or jamming in receiving a positioning signal for obtaining a synchronized time reference at the first network node is eliminated. Hence, time synchronization in a wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
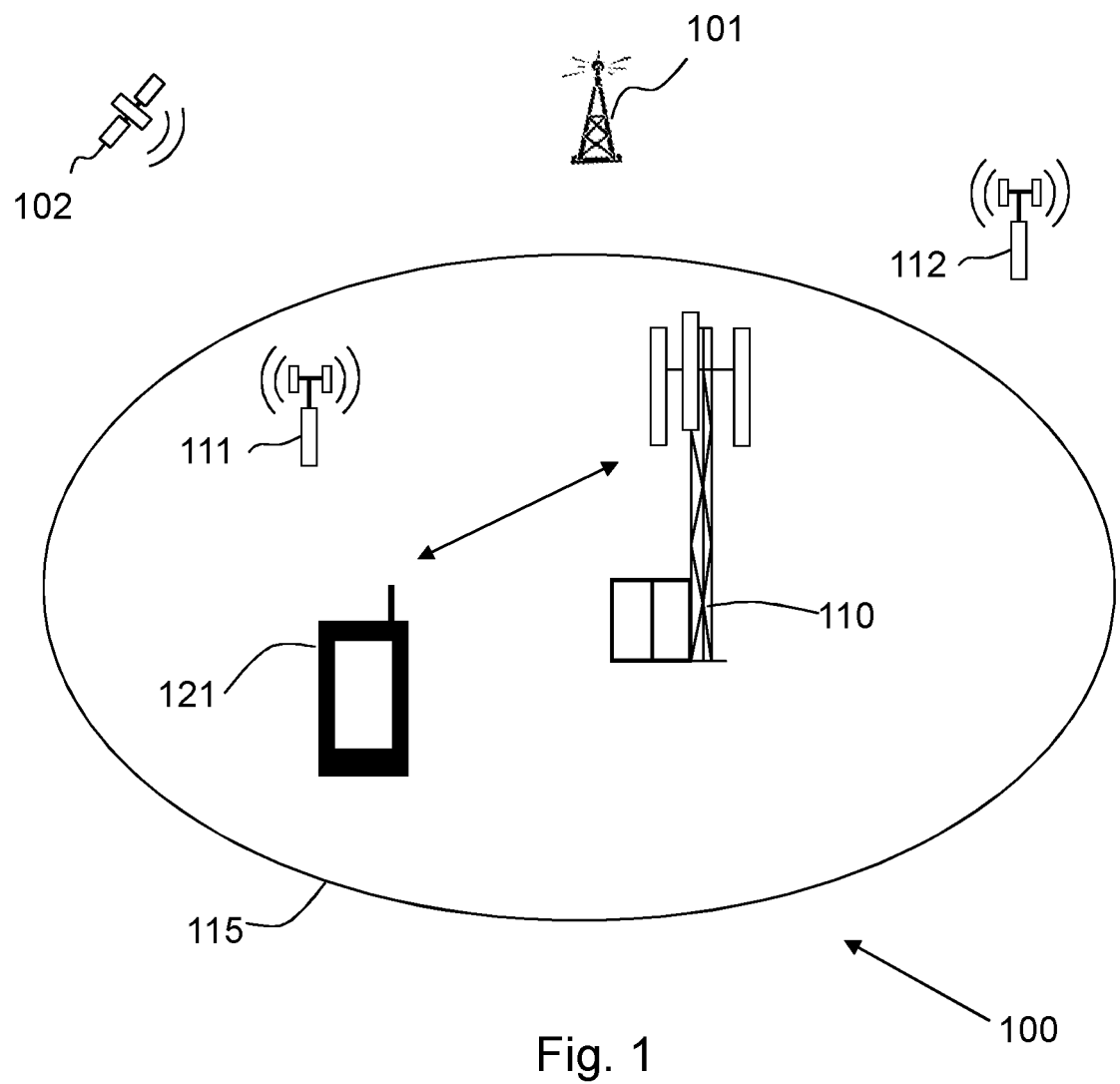
FIG. 1 is a schematic block diagram illustrating embodiments of a first network node in a wireless communications network.

The figures are schematic and simplified for clarity, and they merely show details which are essential to the understanding of the embodiments presented herein, while other details have been left out. Throughout, the same reference numerals are used for identical or corresponding parts or steps.

As part of the developing of the embodiments described herein, it has been realized that no timing protocol, such as, e.g. IEEE1588v2 PTP, or terrestrial navigation or timing systems, such as, e.g. LORAN-C, eLORAN, DCF77, or Chayka etc., available today are capable of providing a cost-effective solution that is able to provide a suitably accurate and precise synchronized time reference for a network node in a wireless communications network.

For example, the IEEE1588v2 PTP is a protocol for transferring time information over a packet based network and reach a resolution for a time reference that is below 1 μs. However, the standard for IEEE1588v2 PTP requires that all network elements in the data path have support for the protocol. If that is not the case, packet delay variation from queuing delays in the wireless communications network will introduce delay impairment and measurement noise. To reach a resolution of the time reference that is below 1 μs would be technically difficult and not economically feasible in most cases.

According to another example, LORAN-C is a ground bound low frequency navigation system. The LORAN-C may be used for determining a time reference, but the LORAN-C time is not tied to Coordinated Universal Time, UTC. Furthermore, LORAN-C also have a low accuracy due to unknown propagation delays due to terrain effects. A further example is eLORAN. eLORAN is an enhanced version of the LORAN-C system. The eLORAN time is tied to UTC and the differences in propagation delay are measured in differential eLORAN reference stations and correction parameters are transmitted over the so-called Loran Data Channel to the receivers. However, in order to extract positioning or accurate timing from eLORAN, preferably three or more transmitters need to be in view. Further, a differential eLORAN station needs to be close by to correct for the so called additional secondary effects, ASF. It should be noted that no eLORAN system is up and operational at this time and, even if an eLORAN system was up and completely operational in some areas, adjacent areas would see the transmitters to close together and not have access to differential eLORAN measurements. Yet another example is DCF77. DCF77 transmits a 77.5 kHz radio signal from Frankfurt and has about a 1900 km coverage. The DCF77 signal comprise a 1 Pulse-Per-Second (1 PPS) component that is accurate to about 100 us in reference to UTC. This accuracy is not enough to meet the time synchronization requirement in a wireless communications network. Yet a further example is Chayka. Chayka is a Russian frequency navigation system. It is similar to LORAN-C in its technology and has similarly low accuracy in positioning and timing.

Hence, none of the above timing protocols or terrestrial navigation or timing systems are suitable candidates to replace the GPS system as the main time synchronization reference in order to alleviate at least some of the drawbacks with the GNNS/GPS system. This issue is addressed by the embodiments described herein by combining signals from a terrestrial navigation or timing systems, such as, e.g. LORAN-C, eLORAN, DCF77, or Chayka etc., and signals from a global positioning system, such as, e.g. a GNSS system, such as, GPS, etc., in order to achieve a reliable and precise synchronized time reference in a network node in a wireless communications network.

One advantage of the embodiments described herein is robustness against interference and/or jamming. While GPS signals are vulnerable to jamming, the use of signals from terrestrial navigation or timing systems provides the benefit of robustness against interference and/or jamming due to its conventional low carrier frequencies, e.g. of around 100 KHz. There are many cases of reported damages by intentional and unintentional interference to GPS signals. Another advantage is that enables a terrestrial radio signal, such as, e.g. LORAN-C, to assist in acquiring a time reference in a wireless communications network. While existing terrestrial radio signals may be a good frequency reference, this is not the case for providing a time reference. The embodiments described herein enables a terrestrial radio signal, such as, e.g. LORAN-C, to be used for achieving an accurate time reference that meets the requirement of a TDD based wireless communications network. A further advantage of the embodiments herein is that by utilizing a terrestrial radio signal with its conventional low carrier frequencies, e.g. of around 100 KHz, also provide the benefit of good penetration through many different types of building materials. Hence, indoor coverage is improved. Yet another advantage of the embodiments herein is that a cost-effective solution is provided by utilizing existing infrastructure alleviating the need for operation and maintenance in the wireless communications network.

Embodiments of a first network 110, a second network node 111 and methods therein will be described in more detail below with reference to FIGS. 1-11.

FIG. 1 depicts a wireless communications network 100 in which embodiments herein may operate. In some embodiments, the wireless communications network 100 may be a radio communications network, such as, 5G/New Radio (NR) network. Although, the wireless communications network 100 is exemplified herein as an 5G/NR network, the wireless communications network 100 may also employ technology of any one of Long Term Evolution (LTE), LTE-Advanced, Wideband Code Division Multiple Access (WCDMA), Global System for Mobile communications/ Enhanced Data rate for GSM Evolution (GSM/EDGE), Worldwide Interoperability for Microwave Access (WiMax), Ultra Mobile Broadband (UMB) or GSM, or any other similar network or system. The wireless communications network 100 may also be an Ultra Dense Network, UDN, which e.g. may transmit on millimetre-waves (mmW).

The wireless communications network 100 comprises a first network node 110. The network node 110 serves at least one cell 115. The network node 110 may correspond to any type of network node or radio network node capable of communicating with a wireless device and/or with another network node, such as, e.g. be a base station, a radio base station, gNB, eNB, eNodeB, a Home Node B, a Home eNode B, femto Base Station (BS), pico BS, etc., in the wireless communications network 100. Further examples of the network node 110 may also be e.g. repeater, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), core network node (e.g. MSC, MME, etc.), operation and management (O&M) node, Operations Support System (OSS) node, Self-Organizing Network (SON) node, positioning node (e.g. E-SMLC), etc. It should also be noted that the first network node 110 is capable of receiving a broadcasted time reference signal from a transmitter 101 of a terrestrial navigation or timing system, such as, e.g. LORAN-C, eLORAN, DCF77, or Chayka etc.

In FIG. 1, a wireless device 121 is located within the cell 115. The wireless device 121 is configured to communicate within the wireless communications network 100 via the network node 110 over a radio link served by the network node 110. The wireless device 121 may refer to any type of wireless device or user equipment (UE) communicating with a network node and/or with another wireless device in a cellular, mobile or radio communication network or system. Examples of such wireless devices are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication, etc.

FIG. 1 further depicts a second network node 111 and a third network node 112. The second and third network nodes 111, 112 are capable of receiving a broadcasted time reference signal. The broadcasted time reference signal may be transmitted from a transmitter 101 of a terrestrial navigation or timing system, such as, e.g. LORAN-C, eLORAN, DCF77, or Chayka etc. The terrestrial navigation or timing system referred to here may be any Terrestrial Position Navigation and Time, PNT, system, TS. Also, the second and third network nodes 111, 112 are capable of receiving a positioning signal from one or more GPS satellites 102 of a GPS system. It should be noted that the positioning signal may also be transmitted from another GNSS positioning system, such as, Glonass, Beido, etc. Furthermore, although referred to as a positioning signal herein for the sake of clarity, the positioning signal may also be a time reference signal that may be used for positioning. Alternatively, the positioning signal, in this case a UTC timing signal, may also be sent to the second and third network node 111, 112 via a connection to a national timing standard or a Two-Way Satellite Time and Frequency Transfer, TWTFT, system. The second and third network node 111, 112 are arranged to communicate with the first network node 110 in the wireless communications network 100. In some embodiments, the second and third network node 111, 112 may form a part of the wireless communications network 100. In this case, in some embodiments, the first network node 110, the second network node 111 and the third network node 112 may communicate over a wired connection. For example, the second and third network node 111, 112 may also be radio base stations similar or identical to the first network node 110.

Furthermore, although embodiments below are described with reference to FIG. 1, this should not be construed as limiting to the embodiments herein, but merely as an example made for illustrative purposes.

Figure 2:
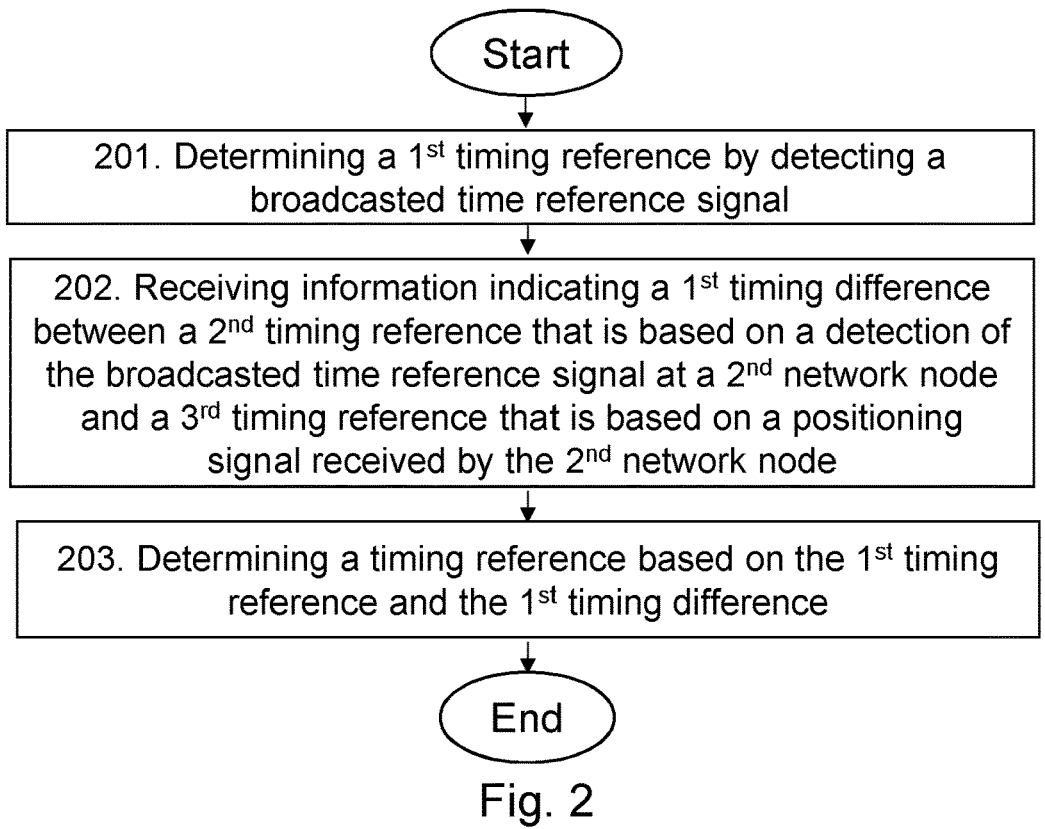
FIG. 2 is a flowchart depicting embodiments of a method in a first network node.

Example of embodiments of a method performed by a first network node 110 for determining a synchronized time reference in a wireless communications network 100 will now be described with reference to the flowchart depicted in FIG. 2. FIG. 2 is an illustrated example of actions or operations which may be taken by the first network node 110 in the wireless communication network 100.

Action 201

Figure 4:
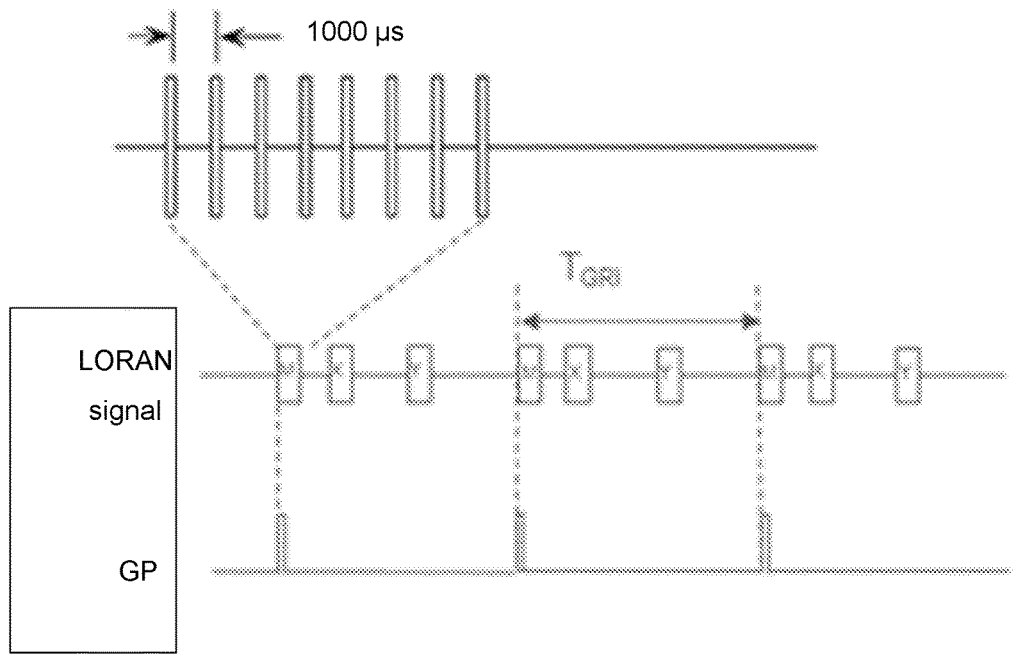
FIG. 4 is a schematic illustration of a broadcasted time reference signal according to LORAN-C and a Group Pulse (GP) signal based thereon.
Figure 5:
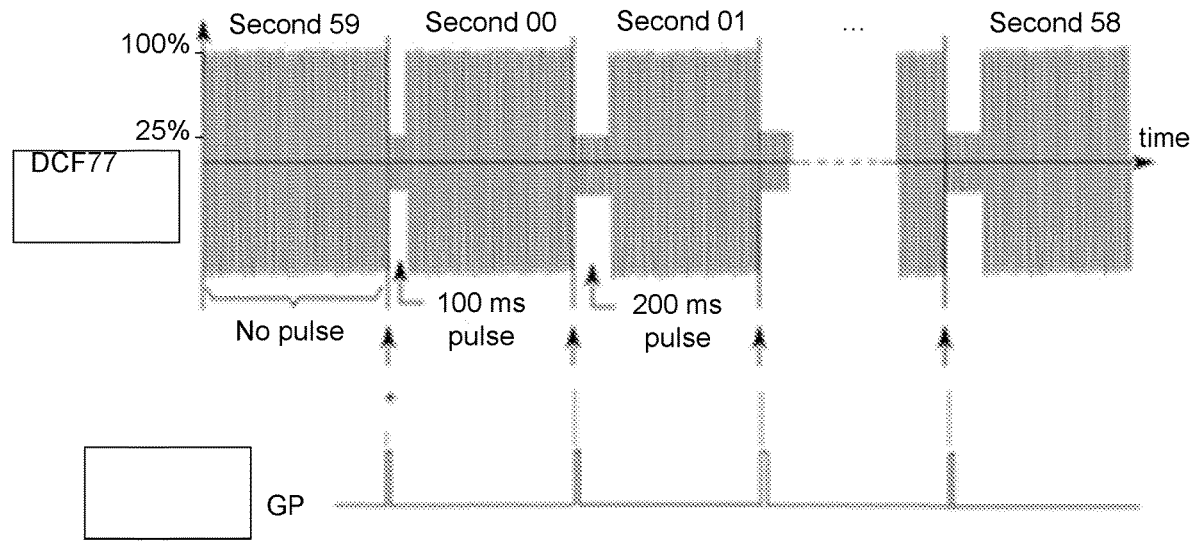
FIG. 5 is a schematic illustration of a broadcasted time reference signal according to DCF77 and a Group Pulse (GP) signal based thereon.

In this action, the first network node 110 determines a first timing reference by detecting a broadcasted time reference signal. This means that the first network node 110 may detect the broadcasted time reference signal of a terrestrial navigation or timing system and from the broadcasted time reference signal determine a timing reference. In some embodiments, the broadcasted time reference signal is a signal having a frequency located in a range of about 50-100 kHz. Examples of how this may be performed by the first network node 110 are illustrated in FIGS. 4-5. FIG. 4 shows a broadcasted time reference signal according to a LORAN-C system. The broadcasted time reference signal comprise a number of groups of signal pulse chains that are repeated at a specified time interval, $T_{GRI}$. This may also be referred to as Group Repetition Interval, GRI, spacing. Each group of signal pulse chains comprise a number pulses having a time spacing such that they are separated in time by 1000 μs. From this broadcasted time reference signal, the first network node 110 may detect a group pulse signal, GP. This group pulse signal, GP, may be determined by the first network node 110 as the first timing reference. FIG. 5 show a broadcasted time reference signal of 77.5 kHz according to a DCF77 system. Here, the broadcasted time reference signal transmits a 100 ms pulse at about 25% of its maximum amplitude at the beginning of every minute. Also, at the beginning of every second, the broadcasted time reference signal transmits a 200 ms pulse at about 25% of its maximum amplitude. From this broadcasted time reference signal, the first network node 110 may detect a group pulse signal, GP. This group pulse signal, GP, may be determined by the first network node 110 as the first timing reference.

Action 202

Figure 6:
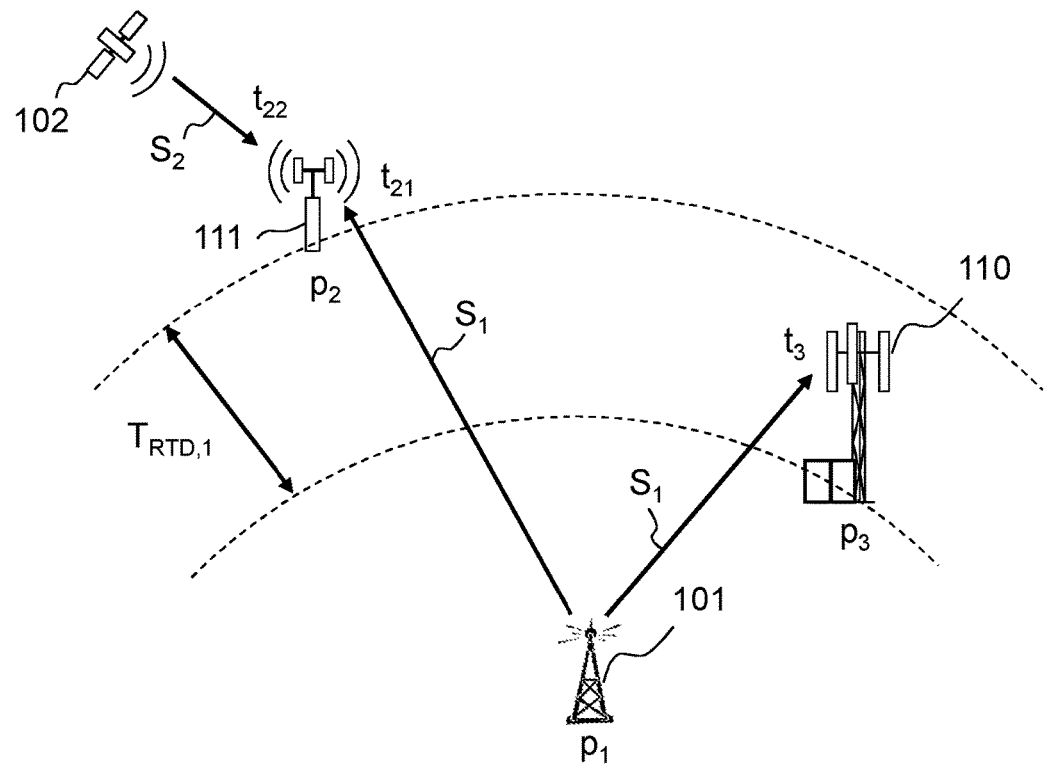
FIG. 6 is another schematic block diagram illustrating embodiments of a first and second network node.

The first network node 110 also receives information indicating a first timing difference between a second timing reference that is based on a detection of the broadcasted time reference signal at a second network node 111 and a third timing reference that is based on a positioning signal received by the second network node 111. This information may, for example, be collected and transmitted from the second network node 111 to the first network node 110. One example of how this may be performed by the second network node 111 is illustrated in FIG. 6. FIG. 6 depicts an example scenario in which a transmitter 101 of a terrestrial navigation or timing system at time, $t_1$, broadcasts a time reference signal, $S_1$. The broadcasted time reference signal, $S_1$, is then received at the second network node 111 at time, $t_{21}$, and at the first network node 110 at time, $t_3$. The second network node 111 may also receive a positioning signal, $S_2$, at time, $t_{22}$, e.g. from the one or more GPS satellites 102. The second network node 111 may then determine a first timing difference, $\Delta t_{21\_t_{22}}$, by measuring the time interval between the detection of the broadcasted time reference signal, $S_1$, and the positioning signal, $S_2$, at the second network node 111. After the determination, the second network node 111 may transmit information indicating the determined first time difference, $\Delta t_{21\_t_{22}}$, to the first network node 110.

Figure 7:
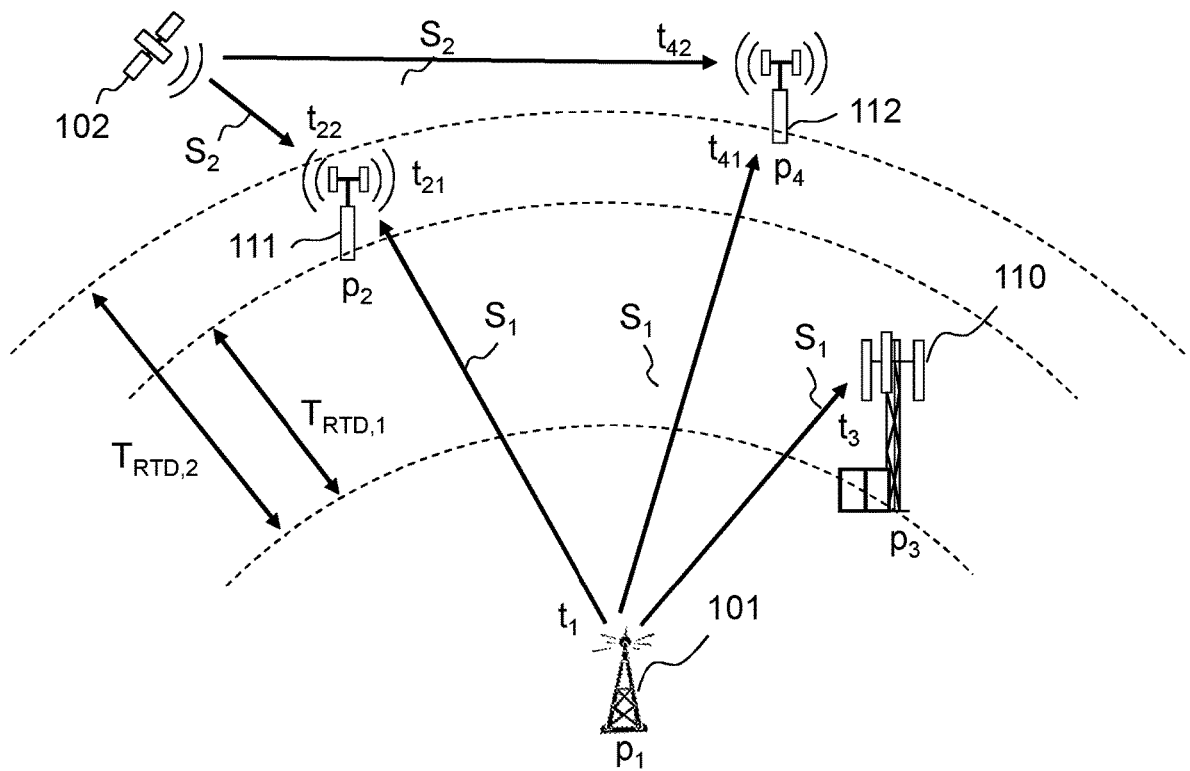
FIG. 7 is a further schematic block diagram illustrating embodiments of a first and second network node.

In some embodiments, the first network node 110 may also receive information indicating at least a second timing difference between at least a fourth timing reference determined by at least a third network node by detecting the broadcasted time reference signal at the at least third network node 112, and at least a fifth timing reference based on the positioning signal received by the at least third network node 112. This information may, for example, be collected and transmitted from the third network node 112 to the first network node 110. One example of how this may be performed by the third network node 112 is illustrated in FIG. 7. FIG. 7 depicts an extended scenario in relation to the example scenario in FIG. 6 in that the broadcasted time reference signal, $S_1$, is also received at the third network node 112 at time, $t_{41}$. The third network node 112 may also receive a positioning signal, $S_2$, at time, $t_{42}$, e.g. from the one or more GPS satellites 102. The third network node 112 may then determine a second timing difference, $\Delta t_{41\_t_{42}}$, by measuring the time interval between the detection of the broadcasted time reference signal, $S_1$, and the detection of the positioning signal, $S_2$, at the third network node 112. After the determination, the third network node 112 may transmit information indicating the determined first time difference, $\Delta t_{41\_t_{42}}$, to the first network node 110.

In some embodiments, the positioning signal is a global positioning signal. In this case, the global positioning signal may be transmitted from one or more GPS satellites 102 of a GPS system. However, it should be noted that the positioning signal may also be transmitted from another GNSS positioning system, such as, Glonass, Beido, etc. Alternatively, in some embodiments, the positioning signal may also be sent to the second network node 111 via a connection to a national timing standard or a Two-Way Satellite Time and Frequency Transfer, TWTFT, system.

In some embodiments, the first network node 110 may also receive information indicating the position of the second network node 111. Additionally, in some embodiments, the first network node 110 may also receive information indicating a Time-of-Day, ToD, at the second network node 111. Optionally, information indicating the position of the second network node 111 and the ToD at the second network 111 may already be comprised in the first network node 110.

Action 203

After determining the first timing reference in Action 201 and receiving the information in Action 202, the first network node 110 determines a synchronized time reference for the first network node 110 based on the determined first timing reference and the received first timing difference. By using the received first timing difference, i.e. a comparison in time of how the broadcasted time reference signal and the positioning signal relate to each other at the second network node 111, the first network node 110 may compensate for the time offset or phase difference between the two signals at the second network node 111 in order to synchronize its own received broadcasted time reference signal, i.e. the broadcasted time reference signal received by the first network node 110 in Action 201, with the positioning signal. Hence, the synchronized time reference at the first network node 110 may, for example, be a time reference that is synchronized with a GPS 1 Pulse-Per-Second, PPS, signal. One example of how the first network node 110 may determine the synchronized time reference is described in more detail below with reference to FIG. 9.

In some embodiments, the first network node 110 may determine the synchronized time reference further based on a first relative time difference between detection of the broadcasted time reference signal at the first network node 110 and detection of the broadcasted time reference signal at the second network node 111. In order to compensate using the received first timing difference, the first network node 110 may determine a first relative time difference, $T_{RTD,1}$. Alternatively, this information may be determined upon initialization or be pre-set in the first network node 110. The first relative time difference, $T_{RTD,1}$, may be determined according to Eq. 1:

$$T_{RTD,1} = (d_2 - d_1)/v \quad \text{(Eq. 1)}$$

wherein $d_1$ is the distance between the transmitter 101 and the first network node 110, $d_2$ is the distance between the transmitter 101 and the second network node 111, and v is the speed of the transmitting signal.

For example, in the scenario shown in FIG. 6, the distance $d_1$ between the transmitter 101 and the first network node 110 is $d_1 = p_3 - p_1$, wherein $p_1$ is the location of the transmitter 101 and $p_3$ is the location of the first network node 110. Also, the distance $d_2$ between the transmitter 101 and the second network node 111 is $d_2 = p_2 - p_1$, wherein $p_1$ is the location of the transmitter 101 and $p_2$ is the location of the second network node 111. Since the distance $d_1$ is different from $d_2$, the broadcasted time reference signal $S_1$ will arrive at the first network node 110 earlier than at the second network node 111. Thus, there will be a first relative time difference, $T_{RTD,1}$, illustrated in the scenario shown in FIG. 6, that is required to be compensated for in order to achieve a synchronized time reference.

In case information indicating at least a second timing difference has been received in Action 402, the first network node 110 may determine the synchronized time reference further based on the received at least second timing difference. This means that the first network node 110 may receive more than one timing difference from different network nodes. For example, in the scenario shown in FIG. 7, the first network node 110 may receive a first timing difference from the second network node 111 and/or a second timing difference from the third network node 112. This enables an even higher accuracy of the synchronized time reference.

Also, in this case, the first network node 110 may determine the synchronized time reference further based on at least a second relative time difference between detection of the broadcasted time reference signal at the first network node and detection of the broadcasted time reference signal at the at least third network node. In order to compensate for the received second timing difference, the first network node 110 may, similarly as for the first timing difference, determine a second relative time difference, $T_{RTD,2}$. Optionally, this information may be determined upon initialization or be pre-set in the first network node 110. The second relative time difference, $T_{RTD,2}$, may be determined in a similar way as described above for the first relative time difference, $T_{RTD,1}$. In some embodiments, the first network node 110 may determine the first and second relative time differences based on information about the location of the first network node, the location of the transmitter 101 of the broadcasted time reference signal, and the location of the second and/or at least third network nodes, respectively. This information may be determined upon initialization or be pre-set in the first network node 110.

In some embodiments, the first network node 110 may determine the synchronized time reference further based on a third timing difference, wherein the third timing difference is determined based on a weighted average of the first and the at least second timing difference indicated in the received information. This means that the first network node 110 may, for example, utilize the first and second received timing difference from the second and third network nodes 111, 112 by determining a joint timing difference based thereon. This provides a higher accuracy of the synchronized time reference as compared to using only one timing reference from one other network node. In this case, the first and the at least second timing difference may be weighted in the weighted average based on the distances of the corresponding second and at least third network node to the first network node, respectively. This advantageously allows the first network node 110 to assign different level of confidence to the first and at least second timing differences depending on their distance from the first network node 110. Here, the first network node 110 may assign a first distance an equal or higher weight in the weighted average than a second distance when the first distance is equal to or shorter than the second distance. This means that the first network node 110 may assign a higher level of confidence in a determined timing difference from a network node that is located closer to the first network node 110, e.g. the second network node 111 in the scenario shown in FIG. 7, than in a determined timing difference from another network node that is located farther away from the first network node 110, e.g. the third network node 112 in the scenario shown in FIG. 7. Alternatively, it should also be noted that instead of the distances of the corresponding second and at least third network node to the first network node, the first and the at least second timing difference may in a similar way be weighted in the weighted average based on received signal strength or Signal-to-Noise Ratio, SNR or SINR, of signals from the second network node 111 and the at least third network node 112, respectively, to the first network node 110.

Figure 3:
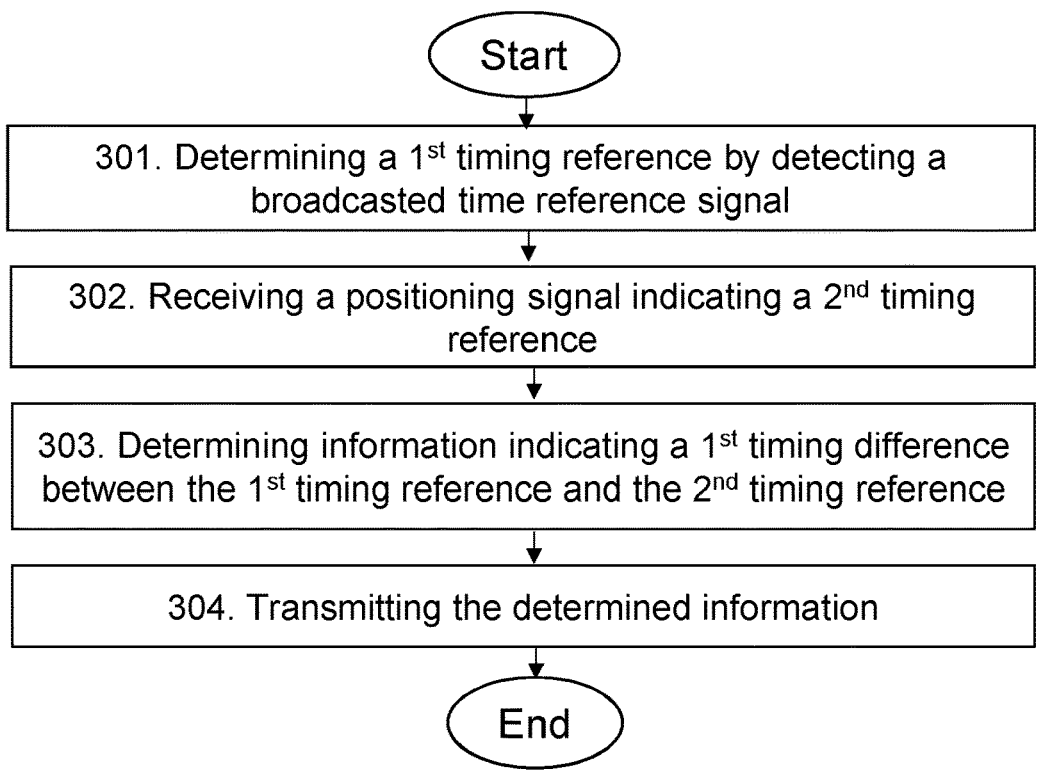
FIG. 3 is a flowchart depicting embodiments of a method in a second network node.

Example of embodiments of a method performed by a second network node 111 for enabling a synchronized time reference in a wireless communications network 100 will now be described with reference to the flowchart depicted in FIG. 3. FIG. 3 is an illustrated example of actions or operations which may be taken by the second network node 111 in the wireless communication network 100.

Action 301

In this action, the second network node 111 determines a first timing reference by detecting a broadcasted time reference signal. This means that the second network node 111 may detect the broadcasted time reference signal of a terrestrial navigation or timing system and from the broadcasted time reference signal determine a timing reference. In some embodiments, the broadcasted time reference signal is a signal having a frequency located in a range of about 50-100 kHz. Examples of how this may be performed by the second network node 111 are illustrated in FIGS. 4-5, and may be performed in the same manner as described above for the first network node 110 in Action 201.

Action 302

The second network node 111 also receives a positioning signal indicating a second timing reference. In some embodiments, the positioning signal is a global positioning signal. In this case, the global positioning signal may be transmitted from one or more GPS satellites 102 of a GPS system. However, it should be noted that the positioning signal may also be transmitted from another GNSS positioning system, such as, Glonass, Beido, etc. Alternatively, in some embodiments, the positioning signal may also be sent to the second network node 111 via a connection to a national timing standard or a Two-Way Satellite Time and Frequency Transfer, TWTFT, system.

Action 303

After determining the first timing reference and receiving the positioning signal in Actions 301-302, the second network node 111 determines information indicating a first timing difference between the first timing reference and the second timing reference. This means that the second network node 111 may determine the time offset or phase difference between the two received signals at the second network node 111. This information may, for example, be indicated by an explicit timing value or a counter offset value.

One example of how this may be performed by the second network node 111 is illustrated in FIG. 6. FIG. 6 depicts an example scenario in which a transmitter 101 of a terrestrial navigation or timing system at time, $t_1$, broadcasts a time reference signal, $S_1$. The broadcasted time reference signal, $S_1$, is then received at the second network node 111 at time, $t_{21}$, and at the first network node 110 at time, $t_3$. The second network node 111 may also receive a positioning signal, $S_2$, at time, $t_{22}$, e.g. from the one or more GPS satellites 102. The second network node 111 may then determine a first timing difference, $\Delta t_{21-t_{22}}$, between the detection of the broadcasted time reference signal, $S_1$, and the positioning signal, $S_2$, at the second network node 111. After the determination, the second network node 111 may transmit information indicating the determined first time difference, $\Delta t_{21-t_{22}}$, to the first network node 110.

Action 304

After the determination in Action 303, the second network node 111 transmits the determined information to a first network node 110 in the wireless communications network 100. This will enable the first network node 110 to use the determined information, i.e. the first timing difference, to compensate for the time offset or phase difference between the two signals at the second network node 111 in order to synchronize its own received broadcasted time reference signal with the positioning signal received by the second network node 111 in Action 302. Hence, the synchronized time reference at the first network node 110 may, for example, be achieved by synchronizing the received broadcasted time reference signal at the first network node 110 with a GPS 1 Pulse-Per-Second, PPS, signal received at the second network node 111.

In some embodiments, the second network node 111 may also transmit information indicating the position of the second network node 111 to the first network node 110. This enables the first network node 110 to determine a first relative time difference between the first network node 110 and the second network node 111. However, this information may also be determined and pre-set in the first network node 110 in which case there is no need for the second network node 111 to transmit its position. Additionally, the second network node 111 may also transmit information indicating a Time-of-Day, ToD, at the second network node 111 to the first network node 110.

More detailed embodiments of the first and second network nodes 110,111 and the methods therein will now be described in even further detail below with reference to the example illustrated in FIGS. 8-9.

Figure 8:
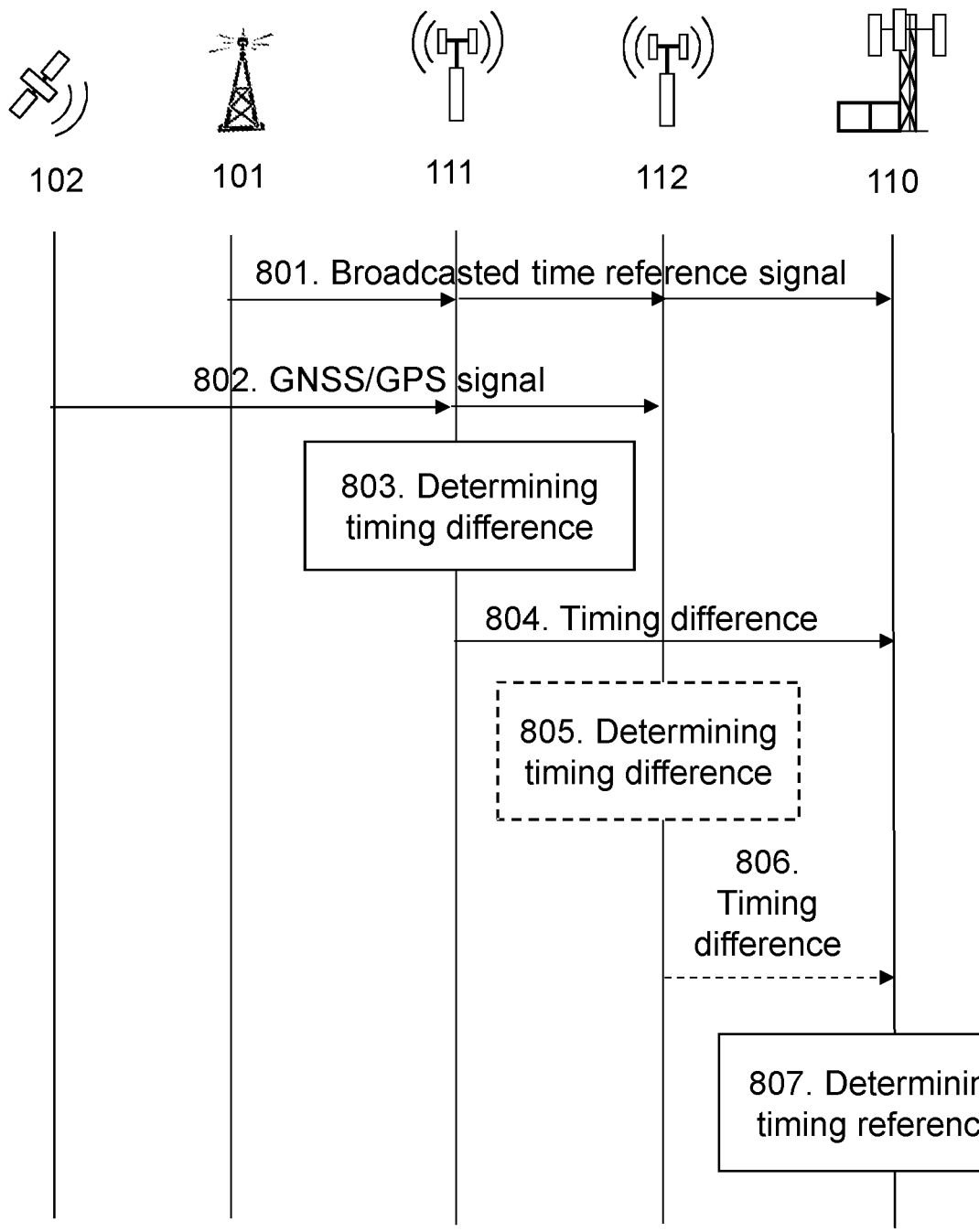
FIG. 8 is a signalling diagram illustrating signalling between a first and a second network node according to some embodiments.

FIG. 8 shows a signalling diagram illustrating an example of signalling between a transmitter 101, a one or more GPS satellites 102, a second network node 111, a third network node 111, 112, and the first network node 110 according to some embodiments.

Action 801. The transmitter 101 broadcasts a time reference signal. The broadcasted time reference signal is received by the first, second and third network node 110, 111, 112 at different points in time. This is because the first, second and third network node 110, 111, 112 are positioned at different geographical locations.

Action 802. The one or more GPS satellites 102 transmits a GPS positioning signal to the second network node 111 and third network node 112.

Action 803. The second network node 111 may then determine a first timing difference, e.g. a time offset or phase difference, at the second network node 111 between the broadcasted time reference signal from the transmitter 101 and the positioning signal transmitted from the one or more GPS satellites 102.

Action 804. The second network node 111 may then transmit information indicating the first timing difference to the first network node 110.

Action 805. The third network node 112 may determine a second timing difference, e.g. a time offset or phase difference, at the third network node 112 between the broadcasted time reference signal from the transmitter 101 and the positioning signal transmitted from the one or more GPS satellites 102.

Action 806. The third network node 112 may then transmit information indicating the second timing difference to the first network node 110.

Action 807. The first network node 110 may then determine a synchronized time reference based on the received first and second timing differences from the second and third network nodes 111, 112 and the broadcasted time reference signal received by the first network node 110 in Action 801.

Figure 9:
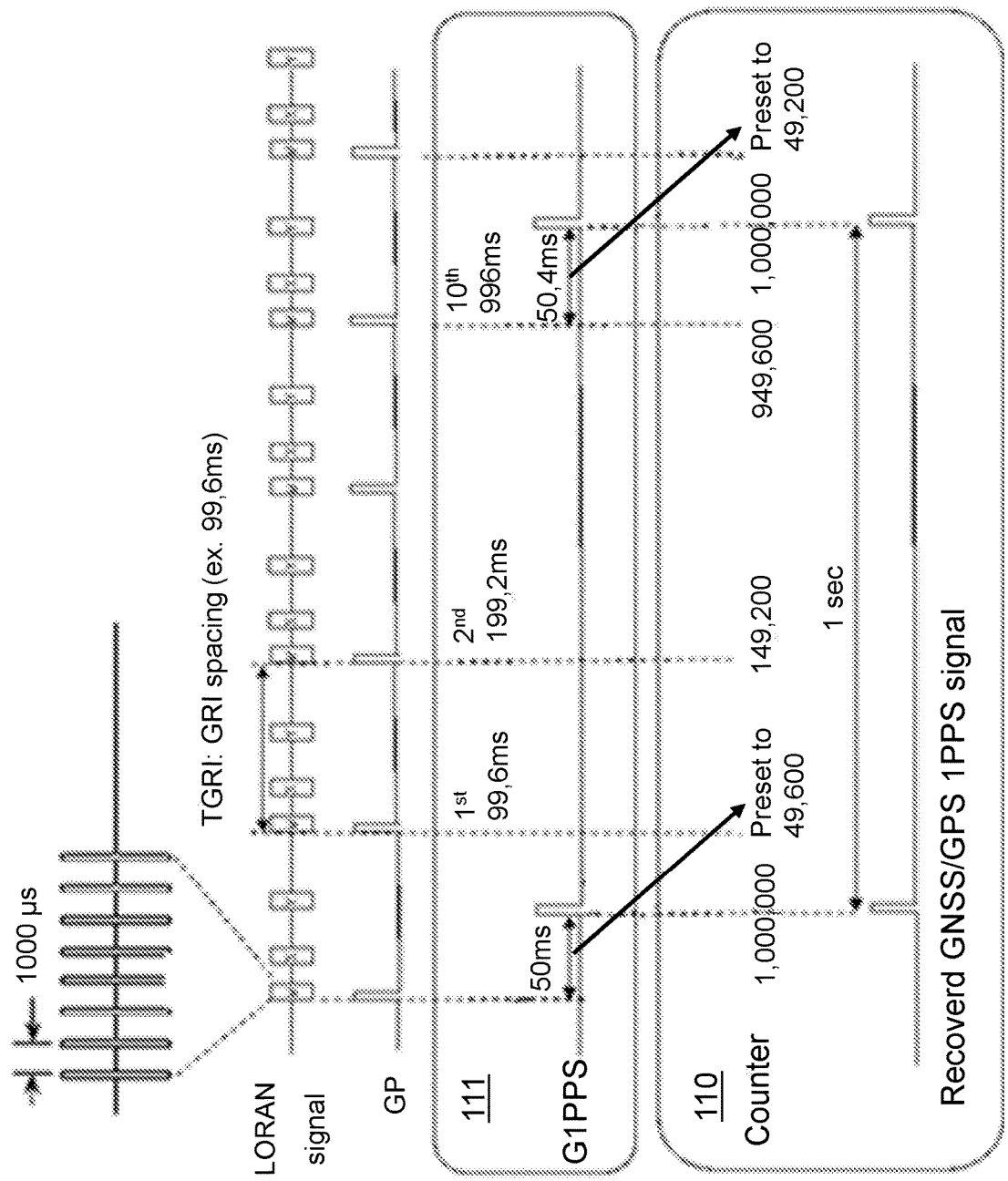
FIG. 9 is another schematic block diagram illustrating an example of time synchronization between a first, second and third network node according to some embodiments.

FIG. 9 is another schematic block diagram illustrating an example of time synchronization between a first and second network node 110, 111 according to some embodiments.

In this example, the broadcasted time reference signal is a LORAN-C signal from which the second network node 111 has determined a Group Pulse, GP, signal. The GP signal may, for example, be detected at every 99.6 ms in case of having a GRI spacing of 99.6 ms. The second network node 111 may then measure a time interval between the GP signal and a received positioning signal, e.g. a GPS 1 PPS signal.

In this example, the time interval may be 50 ms. Thus, the second network node 111 may, for example, send a counter value, e.g. a value of 50.000, corresponding to the time interval of 50 ms to the first network node 110.

Upon receiving the counter value from the second network node 111, the first network node 110 may pre-set a counter with the received counter value at its own determined latest GP pulse obtained from the broadcasted time reference signal, i.e. the same LORAN-C signal. For example, in this case, this means that the counter value may be set to 99.600−50.000=49.600. This allows the GPS 1 PPS signal to recovered at the first network node 110 by generating a 1 PPS signal when the counter expires.

As the second network node 111 receives the next positioning signal, i.e. the next GPS 1 PPS signal, the second network node 110 may again measure a time interval between the GPS 1 PPS signal and the received GP signal at the second network node 111. In this example, the time interval may be 50.4 ms due to the GRI spacing of the LORAN-C signal. Thus, the second network node 111 may, for example, send a new counter value to the first network node 110, e.g. a value of 50.400, corresponding to the time interval of 50.4 ms. Upon receiving the new counter value from the second network node 111, the first network node 110 may pre-set the counter again with the received new counter value at its own determined latest GP pulse obtained from the broadcasted time reference signal is a LORAN-C signal. For example, in this case, this means that the counter value may be set to 99.600−50.400=49.200. This again allows the GPS 1 PPS signal to be recovered at the first network node 110 by generating a 1 PPS signal when the counter expires.

Figure 10:
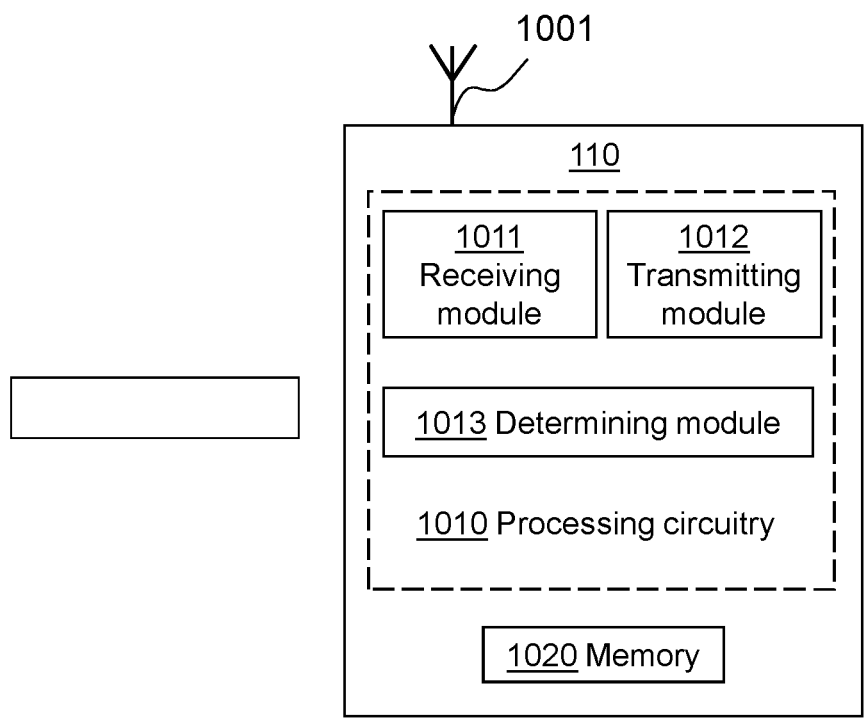
FIG. 10 is a block diagram depicting embodiments of a first network node.

To perform the method actions in the first network node 110 for determining a synchronized time reference in a wireless communication network 100, the first network node 110 may comprise the following arrangement depicted in FIG. 10. FIG. 10 shows a schematic block diagram of embodiments of a first network node 110. The embodiments of the first network node 110 described herein may be considered as independent embodiments or may be considered in any combination with each other to describe non-limiting examples of the example embodiments described herein.

The first network node 110 may comprise processing circuitry 1010, a memory 1020 and at least one antenna 1001. The processing circuitry 1010 may also comprise a receiving module 1011 and a transmitting module 1012. The receiving module 1011 and the transmitting module 1012 may comprise Radio Frequency, RF, circuitry and baseband processing circuitry capable of transmitting a radio signal in the wireless communications network 100. The receiving module 1011 and the transmitting module 1012 may also form part of a single transceiver. The at least one antenna 1001 and the receiving module 1011 may also be configured to receive a broadcasted time reference signal. This may also be referred to as forming a TS Receiver Module, TSRM. The broadcasted time reference signal may be a signal having a frequency located in a range of about 50-100 kHz, and may be transmitted from a transmitter 101 of a terrestrial navigation or timing system, such as, e.g. LORAN-C, eLORAN, DCF77, or Chayka, etc. Furthermore, the receiving module 1011 and the transmitting module 1012 may also be capable of communicating with other nodes in the wireless communications network 100, such as, e.g. the second network node 111 and the at least third network node 112.

It should also be noted that some or all of the functionality described in the embodiments above as being performed by the first network node 110 may be provided by the processing circuitry 1010 executing instructions stored on a computer-readable medium, such as, e.g. the memory 1020 shown in FIG. 10. Alternative embodiments of the first network node 110 may comprise additional components, such as, for example, a determining module 1013, responsible for providing its respective functionality necessary to support the embodiments described herein.

The first network node 110 or processing circuitry 1010 is configured to, or may comprise the determining module 1013 configured to, determine a first timing reference by detecting a broadcasted time reference signal. Also, the first network node 110 or processing circuitry 1010 is configured to, or may comprise the receiving module 1011 configured to, receive information indicating a first timing difference between a second timing reference that is based on a detection of the broadcasted time reference signal at a second network node and a third timing reference that is based on a positioning signal received by the second network node. Further, the first network node 110 or processing circuitry 1010 is configured to, or may comprise the determining module 1013 configured to, determine a synchronized time reference for the first network node based on the determined first timing reference and the received first timing difference.

In some embodiments, the first network node 110 or processing circuitry 1010 may be configured to, or may comprise the determining module 1012 configured to, further determine the synchronized time reference based on a first relative time difference between detection of the broadcasted time reference signal at the first network node 110 and detection of the broadcasted time reference signal at the second network node 111.

In some embodiments, the first network node 110 or processing circuitry 1010 is configured to, or may comprise the receiving module 1011 configured to, receive information indicating at least a second timing difference between at least a fourth timing reference determined by at least a third network node 112 by detecting the broadcasted time reference signal at the at least third network node 112 and at least a fifth timing reference based on the positioning signal received by the at least third network node 112. In this case, the first network node 110 or processing circuitry 1010 is configured to, or may comprise the determining module 1013 configured to, determine the synchronized time reference based on the received at least a second timing difference. In some embodiments, the first network node 110 or processing circuitry 1010 is configured to, or may comprise the determining module 1013 configured to, further determine the synchronized time reference based on at least a second relative time difference between detection of the broadcasted time reference signal at the first network node 110 and detection of the broadcasted time reference signal at the at least third network node 112.

In some embodiments, the first network node 110 or processing circuitry 1010 is configured to, or may comprise the determining module 1013 configured to, determine the synchronized time reference based on a third timing difference, wherein the third timing difference is determined based on a weighted average of the first and the at least second timing difference indicated in the received information. In this case, the first and the at least second timing difference may be weighted in the weighted average based on the distances of the corresponding second and at least third network node 111, 112 to the first network node 110, respectively. In some embodiments, the first network node 110 or processing circuitry 1010 is configured to, or may comprise the determining module 1013 configured to, determine the synchronized time reference by assigning a first distance an equal or higher weight in the weighted average than a second distance when the first distance is equal to or shorter than the second distance.

In some embodiments, the first network node 110 or processing circuitry 1010 is configured to, or may comprise the determining module 1013 configured to, determine the first and second relative time differences based on information about the location of the first network node 110, the location of the transmitter 101 of the broadcasted time reference signal, and the location of the second and/or at least third network nodes 111, 112, respectively.

Furthermore, the embodiments for determining a synchronized time reference in a wireless communication network 100 described above may be implemented through one or more processors, such as the processing circuitry 1010 in the first network node 110 depicted in FIG. 10, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1010 in the first network node 110. The computer program code may e.g. be provided as pure program code in the first network node 110 or on a server and downloaded to the first network node 110. Thus, it should be noted that the modules of the first network node 110 may in some embodiments be implemented as computer programs stored in memory, e.g. in the memory modules 1020 in FIG. 10, for execution by processors or processing modules, e.g. the processing circuitry 1010 of FIG. 10.

Those skilled in the art will also appreciate that the processing circuitry 1010 and the memory 1020 described above may refer to a combination of analog and digital circuits, and/or one or more processors configured with software and/or firmware, e.g. stored in a memory, that when executed by the one or more processors such as the processing circuitry 1020 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 11:
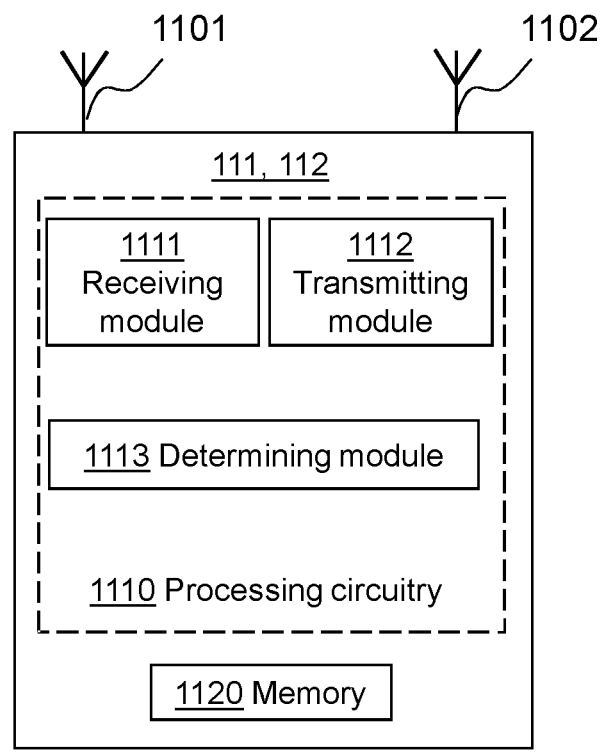
FIG. 11 is a block diagram depicting embodiments of a second network node.

To perform the method actions in the second network node 111 for enabling a synchronized time reference in a wireless communications network 100, the second network node 111 may comprise the following arrangement depicted in FIG. 11. FIG. 11 shows a schematic block diagram of embodiments of the second network node 111. The embodiments of the second network node 111 described herein may be considered as independent embodiments or may be considered in any combination with each other to describe non-limiting examples of the example embodiments described herein.

The second network node 111 may comprise processing circuitry 1110, a memory 1120 and at least two antennas 1101, 1102. The processing circuitry 1110 may also comprise a receiving module 1111 and a transmitting module 1112. The receiving module 1111 and the transmitting module 1112 may comprise Radio Frequency, RF, circuitry and baseband processing circuitry capable of receiving and transmitting a radio signal in the wireless communications network 100. The receiving module 1111 and the transmitting module 1112 may also form part of a single transceiver.

The antenna 1101 and the receiving module 1111 may also be configured to receive a broadcasted time reference signal. This may also be referred to as forming a TS Receiver Module, TSRM. The broadcasted time reference signal may be a signal having a frequency located in a range of about 50-100 kHz, and may be transmitted from a transmitter 101 of a terrestrial navigation or timing system, such as, e.g. LORAN-C, eLORAN, DCF77, or Chayka, etc. The antenna 1102 and the receiving module 1111 may further be configured to receive a positioning signal. The positioning signal may be a positioning signal transmitted from a GPS system, such as, e.g. one or more GPS satellites. Furthermore, the receiving module 1111 and the transmitting module 1112 are capable of communicating with other nodes in the wireless communications network 100, such as, e.g. the first network node 110 and the third network node 112.

It should also be noted that some or all of the functionality described in the embodiments above as being performed by the second network node 111 may be provided by the processing circuitry 1110 executing instructions stored on a computer-readable medium, such as, e.g. the memory 1120 shown in FIG. 11. Alternative embodiments of the second network node may comprise additional components, such as, for example, an determining module 1113, responsible for providing its respective functionality necessary to support the embodiments described herein.

The second network node 111 or processing circuitry 1110 is configured to, or may comprise the determining module 1113 configured to, determine a first timing reference by detecting a broadcasted time reference signal. Also, the second network node 111 or processing circuitry 1110 is configured to, or may comprise the receiving module 1111 configured to, receive a positioning signal indicating a second timing reference. Further, the second network node 111 or processing circuitry 1110 is configured to, or may comprise the determining module 1113 configured to, determine information indicating a first timing difference between the first timing reference and the second timing reference. Also, the second network node 111 or processing circuitry 1110 is configured to, or may comprise the transmitting module 1112 configured to, transmit the determined information to a first network node 110 in the wireless communications network 100.

In some embodiments, the second network node 111 or processing circuitry 1110 may be configured to, or may comprise the transmitting module 1112 configured to, transmit information indicating the position of the second network node 111 to the first network node 110.

Furthermore, the embodiments for enabling a synchronized time reference in a wireless communications network 100 described above may be implemented through one or more processors, such as, the processing circuitry 1110 in the second network node 111 depicted in FIG. 11, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1110 in the second network node 111. The computer program code may e.g. be provided as pure program code in the second network node 111 or on a server and downloaded to the second network node 111. Thus, it should be noted that the modules of the second network node 111 may in some embodiments be implemented as computer programs stored in memory, e.g. in the memory modules 1120 in FIG. 11, for execution by processors or processing modules, e.g. the processing circuitry 1110 of FIG. 11.

Those skilled in the art will also appreciate that the processing circuitry 1110 and the memory 1120 described above may refer to a combination of analog and digital circuits, and/or one or more processors configured with software and/or firmware, e.g. stored in a memory, that when executed by the one or more processors such as the processing circuitry 1120 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

ABBREVIATIONS

CE Channel estimation
ASF Additional Secondary Factor
BS Base Station
CDMA2000 Code Division Multiple Access 2000, 3G standard
DCF77 Deutschland, C=longwave, Frankfurt, 77.5 kHz, standard frequency radio station
eLORAN Enhanced LOng RAnge Navigation
GNSS Global Navigation Satellite System, e.g. GPS
GP Group Pulse
GPS Global Positioning System
GRI Group Repetition Interval
LORAN-C LOng RAnge Navigation version C
LTE Long Term Evolution, 4G standard
PNT Position Navigation and Time system
ppb Parts Per Billion
PPS Pulse Per Second
PTP Precision Time Protocol, IEEE1588
RTD Relative Timed Difference
SF Secondary Factor
SNR Signal to Noise Ratio
TDD Time-Division Duplex
TS Terrestrial PNT System
TSRM TS Receiver Module
UTC Universal Time Coordinated
WCDMA Wideband Code Division Multiple Access, 3G standard

The invention claimed is:

1. A method performed by a first network node for determining a synchronized time reference in a wireless communications network, the method comprising:
   determining a first timing reference by detecting a broadcasted time reference signal transmitted from a transmitter of a LORAN-C, eLORAN, DCF77, or Chayka system;
   receiving information indicating a first timing difference and at least a second timing difference, wherein the first timing difference is between a second timing reference that is based on a detection of the broadcasted time reference signal at a second network node and a third timing reference that is based on a positioning signal received by the second network node, and the second timing difference is between at least a fourth timing reference determined by at least a third network node by detecting the broadcasted time reference signal at the at least third network node, and at least a fifth timing reference based on the positioning signal received by the at least third network node; and
   determining a synchronized time reference for the first network node based on the determined first timing reference and a third timing difference, wherein the third timing difference is determined based on a weighted average of the first and the at least second timing difference indicated in the received information, wherein the weighted average is further based on corresponding distances of the second network node and the at least third network node to the first network node.

2. The method according to claim 1, wherein the determining a synchronized time reference for the first network node is further based on a first relative time difference between detection of the broadcasted time reference signal at the first network node and detection of the broadcasted time reference signal at the second network node.

3. The method according to claim 1, wherein the determining a synchronized time reference for the first network node is further based on at least a second relative time difference between detection of the broadcasted time reference signal at the first network node and detection of the broadcasted time reference signal at the at least third network node.

4. The method according to claim 1, further comprising assigning a first distance an equal or higher weight in the weighted average than a second distance when the first distance is equal to or shorter than the second distance.

5. The method according to claim 3, further comprising determining the second relative time difference based on information about the location of the first network node, the location of the transmitter of the broadcasted time reference signal, and the location of the at least third network node.

6. The method according to claim 1, wherein the broadcasted time reference signal is a signal having a frequency located in a range of about 50-100 kHz, and the positioning signal is a global positioning signal.

7. A first network node for determining a synchronized time reference in a wireless communications network, the first network node being configured to:
determine a first timing reference by detecting a broadcasted time reference signal transmitted from a transmitter of a LORAN-C, eLORAN, DCF77, or Chayka system;
receive information indicating a first timing difference and at least a second timing difference, wherein the first timing difference is between a second timing reference that is based on a detection of the broadcasted time reference signal at a second network node and a third timing reference that is based on a positioning signal received by the second network node, and the second timing difference between at least a fourth timing reference determined by at least a third network node by detecting the broadcasted time reference signal at the at least third network node, and at least a fifth timing reference based on the positioning signal received by the at least third network node; and
determine a synchronized time reference for the first network node based on the determined first timing reference and a third timing difference, wherein the third timing difference is determined based on a weighted average of the first and the at least second timing difference indicated in the received information, wherein the weighted average is further based on corresponding distances of the second network node and the at least third network node to the first network node.

8. The first network node according to claim 7, further configured to determine the synchronized time reference based on a first relative time difference between detection of the broadcasted time reference signal at the first network node and detection of the broadcasted time reference signal at the second network node.

9. The first network node according to claim 7, further configured to determine the synchronized time reference based on at least a second relative time difference between detection of the broadcasted time reference signal at the first network node and detection of the broadcasted time reference signal at the at least third network node.

10. The first network node according to claim 7, further configured to assign a first distance an equal or higher weight in the weighted average than a second distance when the first distance is equal to or shorter than the second distance.

11. The first network node according to claim 8, further configured to determine the first relative time difference based on information about the location of the first network node, the location of the transmitter of the broadcasted time reference signal, and the location of the second network node.

12. The first network node according to claim 9, further configured to determine the second relative time difference based on information about the location of the first network node, the location of the transmitter of the broadcasted time reference signal, and the location of the at least third network node.

13. The first network node according to claim 7, wherein the broadcasted time reference signal is a signal having a frequency located in a range of about 50-100 kHz, and the positioning signal is a global positioning signal.

14. The first network node according to claim 7, comprising a processor and a memory, wherein the memory includes instructions executable by the processor.

* * * * *